Figure 1:
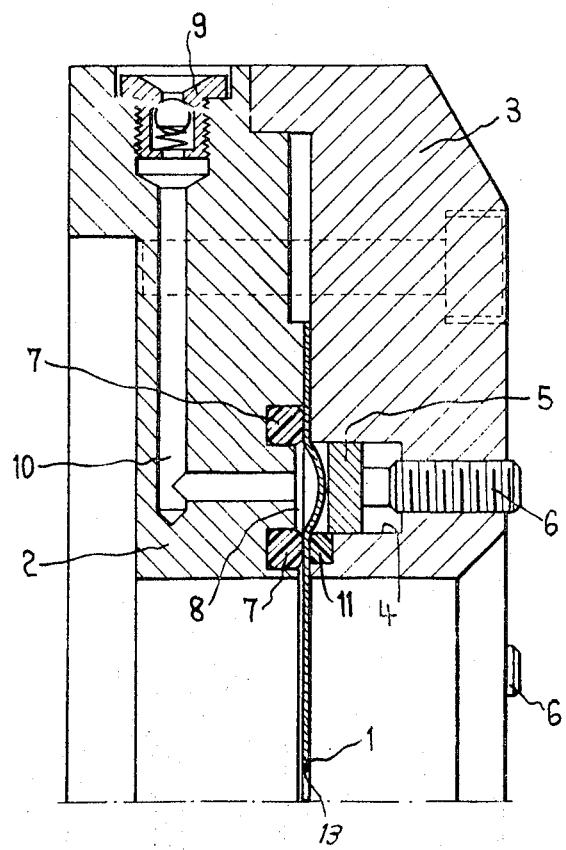

United States Patent [19]
Völki et al.

[11] 3,762,008
[45] Oct. 2, 1973

[54] CLAMPING DEVICE FOR AN INTERNALLY SEPARATING CIRCULAR SAW BLADE

[75] Inventors: Walter Völki, Thun; Alfred Stauffer, Steffisburg, both of Switzerland

[73] Assignee: Machinenfabrik Meyer & Burger AG, Canton of Berne, Switzerland

[22] Filed: July 9, 1971

[21] Appl. No.: 161,198

[30] Foreign Application Priority Data
Aug. 7, 1970 Switzerland.................. 11917/70

[52] U.S. Cl............................ 29/105, 269/22, 279/2
[51] Int. Cl................................................ B26d 1/12
[58] Field of Search.................... 29/105; 269/22; 279/2; 83/676, 698

[56] References Cited
UNITED STATES PATENTS
| | | | |
|---|---|---|---|
| 3,656,393 | 4/1972 | Goellner | 83/698 X |
| 2,652,749 | 9/1953 | Hagmeister | 29/105 X |
| 3,250,542 | 5/1966 | Winnen et al. | 279/2 UX |
| 3,542,354 | 11/1970 | Fitzpatrick | 269/22 |

Primary Examiner—Andrew R. Juhasz
Assistant Examiner—Leon Gilden
Attorney—Imirie & Smiley

[57] ABSTRACT

A clamping device for an internally separating circular saw blade comprising means for clamping the outer edge of the saw blade and an annular fluid-tight pressure chamber having a peripheral edge portion located intermediate the clamped edge portions of the blade and substantially adjacent the blade, said pressure chamber being adapted to receive a fluid medium under pressure such that at least a portion of the blade of the saw is displaced thereby out of its axial plane.

4 Claims, 2 Drawing Figures

PATENTED OCT 2 1973

3,762,008

INVENTORS
WALTER VOLKI
ALFRED STAUFFER

BY
Imrie & Smiley
Attys.

CLAMPING DEVICE FOR AN INTERNALLY SEPARATING CIRCULAR SAW BLADE

The present invention relates to a clamping device for an internally separating circular saw blade.

In a known clamping device, an axial pressure deforms the saw blade. This is produced by a rubber ring located between the saw blade and a pressure ring. However, such an arrangement has inherent disadvantages. It requires much skill and time to press the rubber ring uniformly against the saw blade by means of the pressure ring and to thus obtain a uniform, gradual deformation of the saw blade without causing eccentricity, imbalance or asymmetry of the clamping effect. For practical reasons, the pressure ring is usually screwed firmly against a rigid portion of the apparatus. In such a case the tolerances of the rubber ring, the supporting surfaces for the rubber ring on the pressure ring, and a washer (if used) against which the saw blade is pressed, have an effect on the clamping force. As a result of the elasticity of the rubber ring, the clamping of the saw blade is made highly elastic, thus making it substantially impossible to achieve satisfactory clamping.

According to the present invention, there is therefore provided a clamping device for an internally separating circular saw blade comprising means for clamping the outer edge of the saw blade and an annular fluid-tight pressure chamber located substantially adjacent the blade which is adapted to receive a fluid medium under pressure such that at least a portion of the blade of the saw is displaced thereby out of its axial plane. The uniform initial tensioning of the saw blade offers no difficulties in such a case, since the pressure of the pressure medium always acts uniformly on the entire circumference of the saw blade. The axial pressure is determined only by the pressure of the medium and differences occurring as a result of tolerances of the rubber ring of its associated supporting surfaces such as occur with a known device, do not arise. If a liquid is used as pressure medium, a practically rigid clamping action is obtained.

Preferably there is additionally provided means for controlling the amount of displacement of the saw blade. Advantageously, the pressure chamber is formed between sealing rings, which rings are in contact with the saw blade.

Alternatively, the pressure chamber is constituted by an annular resilient tube.

Further preferably, the clamping means comprises a pair of rings which are interconnected externally of the edge of the saw blade. Further advantageously, one of the rings is provided with an annular groove of rectangular cross-section, the annular groove being provided with a protective ring of a soft material and being adapted to receive the displaced portion of the saw.

Still further preferably there is additionally provided a pressure ring located on the opposed side of the blade to the pressure chamber, which pressure ring is adapted to be moved against the blade by a plurality of independently adjustable screws.

Still further advantageously the pressure ring is slidably displaceably located in the annular groove.

Figure 2:
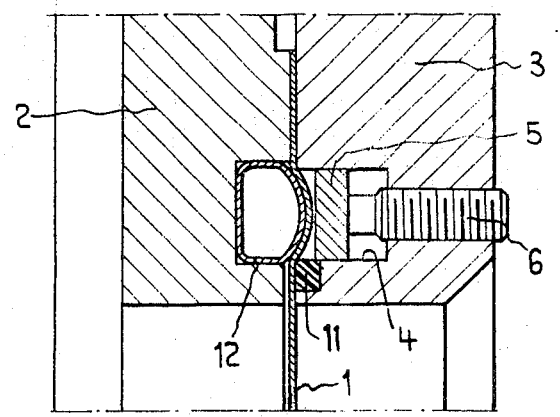

The invention will be further described, purely by way of example, with reference to the accompanying drawings, in which:

FIG. 1 is a partial axial section through a clamping device of the present invention and FIG. 2 is a partial axial section through a second embodiment of a clamping device.

The outer edge of an internally separating blade 1 is clamped between two rings 2 and 3 which are interconnected externally of the outer edge of the saw blade. In the region of the saw blade, 1, the ring 3 is provided with an annular groove 4 of rectangular cross-section. A pressure ring 5 is slidably displaceably located in the groove 4 and can be displaced by means of screws 6. Opposite the groove 4, the ring 2 is provided with two concentric annular grooves within which the sealing rings 7 are inserted. The frontal portion of the ring 2 is set back between the sealing ring 7 and its annular grooves. Accordingly, between the sealing ring 7, the set-back portion of the front of the ring 2 and the saw blade 1, there is formed an annular chamber 8 adapted to receive a pressure medium such as oil through a valve 9 and a conduit 10.

The saw blade is deformed by this pressure medium in the region of the pressure chamber 8 and enters the annular groove 4. Since the end of the saw blade is rigidly clamped between the rings 2 and 3, the saw blade is uniformly tensioned. Previous centering towards the cutting edge 13, effected when the saw blade is clamped between the rings 2 and 3, is not usually lost. However, if a slight deviation of the cutting edge of the saw blade from the circular form occurs during or subsequent to the tensioning of the saw blade by means of the pressure medium, this can be corrected. In such a case, the pressure ring 5, is pressed against the saw blade 1 by the individual adjustment of the screws 6 distributed uniformly over the entire circumference of the ring 3. This partially compensates for the axial pressure of the pressure medium, and consequently, any eccentricity thereof is corrected.

A ring 11 of a synthetic material is located against the inner edge of the opening of the groove 4, thereby permitting a slight radial movement of the saw blade without excessive friction and wear, since there is a high axial pressure at this point.

Since the interconnection of the rings 2 and 3 is effected externally of the saw blade, this latter need not be provided with edge perforations.

In FIG. 2, corresponding parts have the same reference numerals as in FIG. 1. However, instead of providing a pressure chamber defined by seals, a flexible tube 12 is provided which can be filled with a pressure medium through a valve (not shown). Such an arrangement is particularly suitable for pneumatic clamping.

I claim:

1. A clamping device for an internally separating circular saw blade, comprising means for clamping the outer edge of the saw blade and an annular fluid - tight pressure chamber having a peripheral edge portion located intermediate the clamped edge portions of the blade and substantially adjacent the blade, said pressure chamber being adapted to receive a fluid medium under pressure such that at least a portion of the blade of the saw is displaced thereby out of its axial plane, and said means for clamping said outer edge of said saw blade comprising two rings, said rings being interconnected externally of said outer edge of said saw blade.

2. A clamping device as defined in claim 1 wherein one said ring is provided with wall portions defining an annular groove of rectangular cross-section, a protective ring of a soft material being located in said groove, said annular groove being adapted to receive said displaced portion of said saw blade.

3. A clamping device for an internally separating saw blade, comprising means for clamping the outer edge of said saw blade consisting of two rings, said rings being interconnected externally of said outer edge of said saw blade, one said ring having wall portions defining an annular channel of rectangular cross-section, an annular fluid-tight pressure chamber having a pheripheral edge portion located intermediate the clamped edge portions of the blade and located substantially adjacent said blade such that at least a portion of said blade is displaced thereby out of its axial plane and means for controlling the amount of displacement of said blade said means constituted by a pressure ring located on the opposed side of said blade to said pressure chambers wherein said pressure ring is slidably displaceably located in said annular groove.

4. A clamping device as defined in claim 3 wherein, said pressure ring being adapted to be moved against said blade by independantly adjustable screws.

* * * * *

UNITED STATES PATENT OFFICE
CERTIFICATE OF CORRECTION

Patent No. 3,762,008              Dated  October 2, 1973

Inventor(s)   WALTER VOLKL, et al

It is certified that error appears in the above-identified patent and that said Letters Patent are hereby corrected as shown below:

In the Heading:

The Assignee's correct address is -- Steffisburg, Canton of Berne, Switzerland

Signed and sealed this 9th day of July 1974.

(SEAL)
Attest:

McCOY M. GIBSON, JR.
Attesting Officer

C. MARSHALL DANN
Commissioner of Patents